Dec. 18, 1962  R. F. KIMPEL  3,069,278
CEMENT COMPOSITION
Filed Aug. 19, 1957
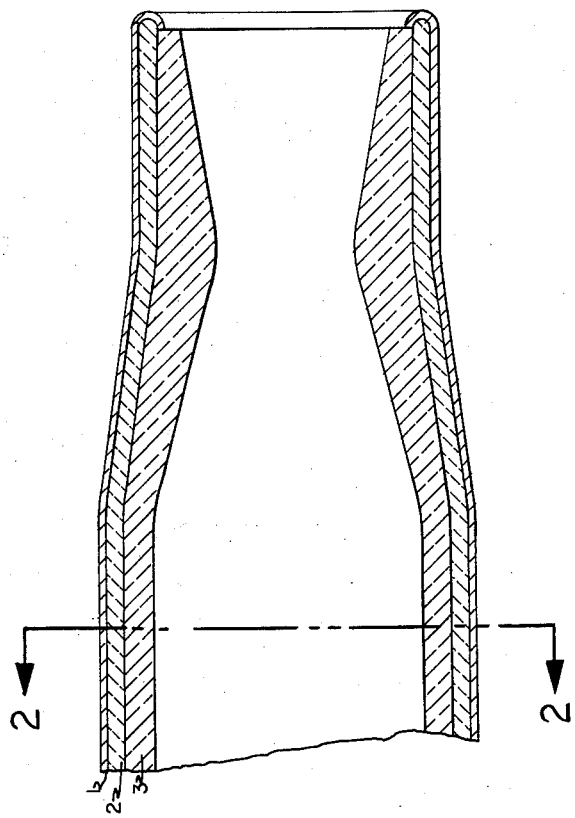
Fig -1-
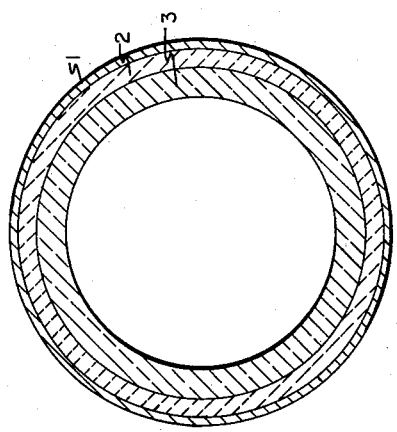
Fig -2-
INVENTOR.
ROBERT F. KIMPEL
BY
*D. Gordon Angus*
ATTORNEY

United States Patent Office 3,069,278
Patented Dec. 18, 1962

3,069,278
CEMENT COMPOSITION
Robert F. Kimpel, Azusa, Calif., assignor to Aerojet-General Corporation, Azusa, Calif., a corporation of Ohio
Filed Aug. 19, 1957, Ser. No. 679,548
4 Claims. (Cl. 106—110)

This invention relates to a novel improved insulating refractory cement and to its preparation. The cement of this invention comprises a hardened mixture of plaster of Paris, a finely divided refractory oxide such as aluminum oxide, a light-weight insulating material such as diatomaceous earth, a plastic clay such as ball clay, and water. This cement is particularly valuable in providing support for ceramic linings in uncooled rocket thrust chambers.

In the conventional operation of rockets, propellants are burned in a thrust chamber producing high temperature gases, generally in excess of 4000° F., at relatively high pressures, generally in excess of 300 p.s.i. The gases are exhausted through a conventional venturi nozzle producing the desired propulsive thrust. These conditions of high temperature and pressure impose severe limitations on rocket chamber construction, and there has long been a need for materials capable of withstanding these conditions so as to avoid the necessity of complex cooling means, such as regeneratively cooled chambers, and also to reduce the weight of materials necessary to maintain structural integrity under these conditions.

One solution to this problem has been the use of refractory ceramic linings, which are capable of withstanding extremely high temperatures, in an uncooled rocket chamber.

The cement of this invention is particularly useful for supporting such refractory ceramic linings in uncooled combustion chambers.

In a ceramic-lined combustion chamber, the ceramic lining is supported within the metal casing of the chamber by an annular layer of cement between lining and casing, the resultant composite wall (ceramic and cement) acting to protect the metal casing from the high combustion temperatures and corrosive gases within the combustion chamber.

FIGURE 1 shows in longitudinal section a typical ceramic lined rocket thrust chamber.

FIGURE 2 is a cross-section on the line 2—2 of FIGURE 1.

Referring now to FIGURES 1 and 2 there is shown a metal chamber casing 1, a ceramic lining 3 and an annular layer of cement 2 which fills the space between the metal casing and the ceramic lining and adheres to both, thus providing firm support for the latter.

Inasmuch as ceramic linings tend to be porous and are rather easily cracked in use because of their brittle nature and susceptibility to mechanical and thermal shock, it is desirable that such a ceramic lining be firmly supported by a refractory material between the lining and the metal casing which it is designed to protect. It is also most important that the refractory material completely fill the annular space between lining and casing to prevent the passage of hot corrosive combustion gases under pressure into this space. Leakage of the hot combustion gases into space between the ceramic lining and the metal casing will result in corrosion and overheating of the metal wall, producing burn-out or chamber rupture. Since rocket combustion chambers are primarily used on airborne vehicles, it is important that the weights of their component parts be kept to a minimum.

Heretofore, cements available for use in supporting ceramic linings in rocket combustion chambers have suffered severe shrinkage under operation conditions or have had undesirably high densities. A suitable cement for this purpose must be capable of withstanding high temperatures, exhibit little change in volume over wide intervals of time and ranges of temperature, show good heat insulating ability, and be of relatively low density, preferably below about 100 lb./cu. ft. In addition, the cement composition, during use, must be readily castable in narrow spaces, such as the extremely narrow annuli between linings and casings of rocket chambers.

A principal object of the present invention is to provide an improved insulating and refractory cement for the ceramic linings in uncooled, ceramic-lined rocket combustion chambers which will be subjected only to a single firing.

The cement composition of this invention is prepared by mixing plaster of Paris, a finely divided refractory oxide such as aluminum oxide, a light-weight insulating material such as calcined diatomaceous earth or perlite, a plastic clay such as ball clay or plastic kaolin, and water. The resulting mixture is prepared in the form of a slurry of the desired consistency, usually such that it can be cast easily, with the aid of vibration, in a narrow annular space much as that between the ceramic liner and the metal casing of a rocket combustion chmaber to substantially fill such space.

The following is an example illustrating the manner of formulating and using the cement of the present invention. This example is included for purposes of illustration only and is not indicative of the scope of the invention which is not limited to the particular conditions set forth therein.

Example I

The following ingredients were mixed in the proportions indicated:

|  | Percent |
|---|---|
| Plaster of Paris | 34.5 |
| Aluminum oxide (325-mesh) | 21.9 |
| Calcined diatomaceous earth (32-mesh) | 9.0 |
| Ball clay (325-mesh) | 1.4 |
| Water | 33.2 |
|  | 100.0 |

In preparing the mixture of the above ingredients, the dry ingredients were first mixed and then stirred into the water with a mechanical stirrer, the stirring being continued for 1 or 2 minutes. The resultant slurry was cast in a mold and, after setting, dried at a temperature of 140°±5° F. to remove the water present in excess of that required for hydration of the plaster. Upon drying, the cement was found to have a specific gravity of about 1.30 g./cc. The linear shrinkage of the cement upon heating through 200° F. was found to be 0.00% to 0.07% and upon heating through 1100° F. (1 hour) it was found to be approximately 0.6%. The cement of this example was an excellent insulating cement for supporting ceramic linings in uncooled rocket combustion chambers.

Example II

The following is an example illustrating the use of my novel cement composition in the fabrication of a ceramic lined rocket thrust chamber.

The cement composition of Example I was prepared as described therein. A ceramic lining was positioned concentrically within a metal chamber casing, the lining being of appropriate size and cross-sectional configuration to fit within the casing and leave a narrow annular space between it and said casing. The cement composition was introduced or cast in the annular space, with vibration of the casing and lining, after which it was allowed to set. After the cement had set it was dried at about 140° F. to remove excess water.

The resulting ceramic-lined chamber was tested by firing a mixture of hydrocarbon fuel and nitric acid therein for 60 seconds, during which the pressure of the combustion gases in the chamber was 315 p.s.i.g.

After the test firing, the chamber was inspected. The ceramic lining, cement, and metal casing were found to be in excellent condition.

The plaster of Paris ingredient of this invention should, for best results, be a high strength plaster such as that manufactured by U.S. Gypsum Co. under the trade name Hydrocal, or its equivalent.

The finely divided refractory oxide ingredient of the invention is preferably an aluminum oxide product of about 90 percent purity or higher and of about 325-mesh particle size. However, other refractory oxides such as $TiO_2$, $MgO$, $ZrO_2$, and mixtures thereof can be employed in place of the aluminum oxide or in admixture with it, if desired.

The conventional method, familiar to those skilled in the art, of referring to the particle sizes of finely divided solid materials by mesh sizes is employed herein. The mesh size of a material indicates the smallest standard Tyler sieve opening through which substantially all particles of the material will pass.

The light-weight insulating component of my novel cement is preferably 32-mesh calcined diatomaceous earth, ranging in particle size distribution from that which is retained on a 60-mesh sieve to that containing about 75 percent of 100-mesh material. Perlite of equivalent particle size range can be substituted for the diatomaceous earth, or admixed therewith, if desired.

The plastic clay component of my cement composition is present as a suspending agent. My preferred clay is ball clay of about 325-mesh particle size although ball clay or other plastic clay, such as a plastic kaolin clay, of about 200-mesh size or below can be used within the scope of my invention. Mixtures of suitable clays are, of course, satisfactory as suspending agents in my novel cement compositions. To avoid confusion, the term "cement composition" is used herein to denote the castable slurry before it has hardened, and the term "cement" is employed to denote the hardened product resulting from the setting of the cement composition.

The preferred ranges of proportions of ingredients in my novel cement compositions are as follows: from about 30 to about 40 percent plaster of Paris; from about 15 to about 30 percent refractory oxide; from about 5 to about 10 percent light-weight insulating material such as diatomaceous earth; from about 1 to about 4 percent plastic clay; and from about 20 to about 36 percent water. The above percentages are based on the total weight of cement composition.

It is usually desirable, for practical purposes, to incorporate a commercial plaster retarding agent, such as sodium citrate, in my novel cement composition. The preferred method of preparing the cement compositions of my invention is to first blend or mix the dry ingredients in a dry mixer, such as a screw conveyor or any other means well-known to those skilled in the art, and then to stir the resulting mixture of dry ingredients into the desired amount of water. If a plaster retarding agent is used, it should preferably be mixed with the water, in an amount from about 0.004 to about 0.006 percent of the total cement composition weight, prior to addition of the other ingredients thereto. Other methods of mixing the ingredients of my novel cement composition are, of course, within the scope of this invention.

As previously noted, the cement compositions of my invention are preferably of suitable consistency for casting in a narrow space such as the annular space between the metal casing and the ceramic liner in a rocket combustion chamber. My cement compositions can be of such consistency that they can easily be cast in an annulus as narrow as 0.08 inch wide when subjected to vibration. The cement setting times will vary, depending on whether plaster retarding agents are used and, if so, in what quantities they are employed.

The cast cement compositions of my invention should, after setting, preferably be dried at temperatures of at least 100° F., to remove the water present in excess of that needed for hydration of the plaster. I have found drying temperatures of 140°±5° F. to be optimum for this purpose.

Although the cement of this invention is ideally suitable as support for ceramic linings in uncooled rocket thrust chambers, it obviously possesses properties which make it useful for other purposes as well.

I claim:

1. A cement composition consisting essentially of a mixture of from about 30 to about 40 percent plaster of Paris; about 15 to about 30 percent finely divided aluminum oxide; about 5 to about 10 percent diatomaceous earth; about 1 to about 4 percent ball clay; and about 20 to about 36 percent water, the above percentages representing weight percentages of the total mixture.

2. A cement composition consisting essentially of a mixture of from about 30 to about 40 percent plaster of Paris; about 15 to about 30 percent aluminum oxide of 325-mesh particle size; about 5 to about 10 percent calcined diatomaceous earth of 32-mesh particle size, of which at least about one-fourth is of particle size greater than 100-mesh; about 1 to about 4 percent ball clay of such particle size that substantially all of it passes through a 200-mesh screen; and about 20 to about 36 percent water, the above percentages representing weight percentages of the total mixture.

3. A cement composition consisting essentially of a mixture of from about 30 to about 40 percent plaster of Paris; about 15 to about 30 percent finely divided aluminum oxide; about 5 to about 10 percent diatomaceous earth; about 1 to about 4 percent ball clay; about 0.004 to about 0.006 percent plaster retarding agent; and about 20 to about 36 percent water, the above percentages representing weight percentages of the total mixture.

4. A cement composition according to claim 3 in which the plaster retarding agent is sodium citrate.

References Cited in the file of this patent

UNITED STATES PATENTS

| | | |
|---|---|---|
| 499,710 | Bronson | June 20, 1893 |
| 1,266,200 | Blumenberg | May 14, 1918 |
| 2,113,375 | Himsworth et al. | Apr. 5, 1938 |
| 2,314,626 | Neiman | Mar. 23, 1943 |
| 2,501,699 | Stecker | Mar. 28, 1950 |
| 2,508,600 | Fitzsimmons | May 23, 1950 |
| 2,658,332 | Nicholson | Nov. 10, 1953 |
| 2,816,418 | Loedding | Dec. 17, 1957 |